United States Patent
Giese (10) Patent No.: US 7,232,266 B2
(45) Date of Patent: *Jun. 19, 2007

(54) SYSTEM FOR OPENING AND CLOSING A RESEALABLE CARTRIDGE

(75) Inventor: Troy A. Giese, Hugo, MN (US)

(73) Assignee: Carestream Health, Inc., Rochester, NY (US)

( * ) Notice: Subject to any disclaimer, the term of this patent is extended or adjusted under 35 U.S.C. 154(b) by 439 days.

This patent is subject to a terminal disclaimer.

(21) Appl. No.: 10/909,702

(22) Filed: Aug. 2, 2004

(65) Prior Publication Data

US 2005/0035533 A1 Feb. 17, 2005

Related U.S. Application Data

(63) Continuation of application No. 10/376,540, filed on Feb. 28, 2003, now Pat. No. 6,832,862.

(51) Int. Cl.
 *G03B 17/26* (2006.01)
(52) U.S. Cl. ...................... 396/518; 271/145
(58) Field of Classification Search ............... 396/517, 396/518, 519; 271/145
 See application file for complete search history.

(56) References Cited

U.S. PATENT DOCUMENTS

| | | | |
|---|---|---|---|
| 5,132,724 A | 7/1992 | Lemberger et al. | 355/72 |
| 5,149,078 A | 9/1992 | Matsuda et al. | 271/145 |
| 5,404,194 A | 4/1995 | Yamamoto et al. | 355/72 |
| 5,473,400 A | 12/1995 | Lemberger et al. | 396/513 |
| 5,480,134 A | 1/1996 | Weber | 271/145 |
| 6,139,005 A | 10/2000 | Nelson et al. | 271/90 |
| 6,832,862 B2 * | 12/2004 | Giese | 396/518 |

FOREIGN PATENT DOCUMENTS

| | | |
|---|---|---|
| EP | 0 624 535 | 4/1994 |
| EP | 1 199 268 | 4/2002 |

* cited by examiner

*Primary Examiner*—Christopher Mahoney
(74) *Attorney, Agent, or Firm*—Susan L. Parulski (57) ABSTRACT

A system for opening and closing a resealable cartridge having a tray and a flexible cover resealably engaged with the tray. The system comprises: a base for receiving the tray of the cartridge; a roller shaft having means for engaging the cover of the cartridge; positioning means operably connected to the roller shaft to affect positioning of the roller shaft relative to the cartridge between a first position wherein the roller shaft is spaced from the cartridge and a second position different from the first position wherein the roller shaft is not spaced from the cartridge; and a motor for rotating the roller shaft in a first rotational direction to wind the cover about the roller shaft, thereby removing at least a portion of the cover from the tray, and for rotating the roller shaft in a second rotational direction to unwind the cover from the roller shaft thereby resealably engaging the cover with the tray.

12 Claims, 13 Drawing Sheets

SYSTEM FOR OPENING AND CLOSING A RESEALABLE CARTRIDGE

CROSS REFERENCE TO RELATED APPLICATION

This is a continuation of U.S. Ser. No. 10/376,540, filed on Feb. 28, 2003, now U.S. Pat. No. 6,832,862 commonly assigned and incorporated herein by reference.

FIELD OF THE INVENTION

The invention relates generally to resealable cartridges, and more particularly, to a system for opening and closing a resealable cartridge.

BACKGROUND OF THE INVENTION

Resealable cartridges have been employed in various applications for transporting articles. Such resealable cartridges are desirable features, including preventing exposure of the transported articles to environmental elements. For example, laser imaging machines use resealable cartridges to transport photosensitive media, such as x-ray and other types of medical imaging photographic film, since it is sometimes necessary to load a laser imaging machine with a different type or size of photosensitive media. Such laser imaging machines are well known in the art for forming an image by scanning a modulated laser beam across the photosensitive media. Prior to the formation of the image, a cartridge containing one or more photosensitive media is loaded into the laser imaging machine. The cartridge includes a tray having a supply area for containing the photosensitive media, a media access opening, and a flexible cover adhesively attached to tray to extend over the media access opening to form a light-tight seal of the cartridge. The light-tight seal enables the cartridge to be transported in light conditions that would otherwise cause exposure of the photosensitive media within the cartridge. U.S. Pat. No. 5,132,724 (Lemberger), U.S. Pat. No. 5,473,400 (Lemberger), and U.S. Pat. No. 5,480,134 (Weber) show examples of a resealable cartridge, each of these being incorporated herein by reference.

The interior of a laser imaging machine provides a light-tight environment. To carry out an imaging operation, the laser imaging machine withdraws one or more photosensitive media from the access opening of the cartridge. Therefore, the laser imaging machine requires a system that can open the cartridge within the laser imaging machine to allow withdrawal of the photosensitive media from the access opening, and close/reseal the cartridge within the laser imaging machine to effect the light-light seal. In the ordinary course of use, the cartridge must be opened and closed several times.

U.S. Pat. No. 5,132,724 (Lemberger) and U.S. Pat. No. 5,480,134 (Weber) show examples of mechanisms for opening and closing a resealable media cartridge. While such systems may have achieved certain degrees of success in their particular applications, they employ a relatively complicated mechanism that can be expensive to manufacture and have other disadvantages.

Accordingly, there is a need for a system which is capable of reliably performing the opening/closing functions, commercially viable, reduced in size, provides good resealing, and efficiently manufacturable.

The present invention provides a system for opening and closing a resealable cartridge which is capable of reliably performing the opening/closing functions, commercially viable, reduced in size, provides good resealing, and efficiently manufacturable.

In addition, wrinkles in the cartridge cover can occur while closing, and such wrinkles can decrease the usable life of the cartridge. In addition to wrinkles, laser imaging machines which use high sealing forces tend to displace the cover adhesive. The present invention increases the usable life of the cartridge by reducing/eliminating both wrinkles and displaced cover adhesive.

Additional features and advantages of the present invention will be set forth in part in the description that follows, and in part will be apparent from the description, or may be learned by practice of the invention. The advantages of the invention will be realized and attained by the system particularly pointed out in the written description and claims thereof, as well as in the appended drawings.

SUMMARY OF THE INVENTION

An object of the present invention is to provide a system for opening and closing a resealable cartridge.

Another object of the present invention is to provide such a system which is capable of reliably performing the opening/closing functions.

A further object of the present invention is to provide such a system which is commercially viable, reduced in size, provides good resealing, and efficiently manufacturable.

These objects are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

According to one aspect of the invention, there is provided a system for opening and closing a resealable cartridge having a tray and a flexible cover resealably engaged with the tray. The system comprises: a base for receiving the tray of the cartridge; a roller shaft having means for engaging the cover of the cartridge; positioning means operably connected to the roller shaft to affect positioning of the roller shaft relative to the cartridge between a first position wherein the roller shaft is spaced from the cartridge and a second position different from the first position wherein the roller shaft is not spaced from the cartridge; and a motor for rotating the roller shaft in a first rotational direction to wind the cover about the roller shaft, thereby removing at least a portion of the cover from the tray, and for rotating the roller shaft in a second rotational direction to unwind the cover from the roller shaft thereby resealably engaging the cover with the tray.

BRIEF DESCRIPTION OF THE DRAWINGS

The foregoing and other objects, features, and advantages of the invention will be apparent from the following more particular description of the preferred embodiments of the invention, as illustrated in the accompanying drawings.

DETAILED DESCRIPTION OF THE INVENTION

The following is a detailed description of the preferred embodiments of the invention, reference being made to the drawings in which the same reference numerals identify the same elements of structure in each of the several figures.

Figure 1:
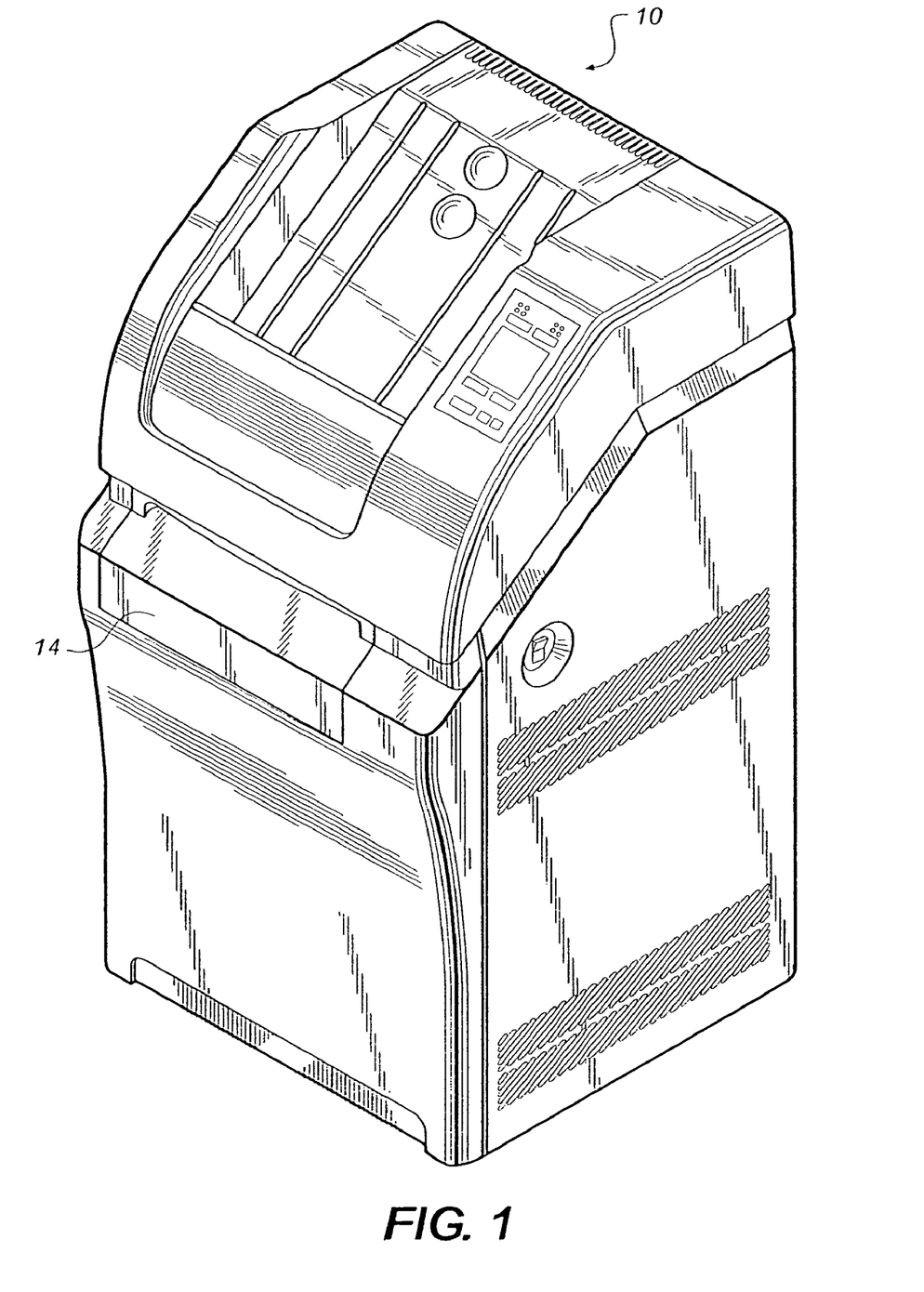
FIG. 1 shows an exemplary laser imaging machine configured for use with a resealable cartridge, and suitable for incorporation of an opening and closing system in accordance with the present invention.

FIG. 1 shows an exemplary laser imaging machine 10 configured for use with a resealable cartridge, and suitable for incorporation of an opening and closing system in accordance with the present invention. Machine 10 can include a hinged loading door 14 into which a resealable cartridge can be loaded for imaging operations. Other suitable laser imaging machines can employ a loading drawer that slides out to receive the cartridge. Other loading arrangements may be known to those skilled in the art.

The cartridge opening/closing system of the present invention is mounted within laser imaging machine 10. After the cartridge has been loaded within laser imaging machine 10, the door/drawer is closed to seal the cartridge within the light-tight environment of laser imaging machine 10. The opening/closing system then operates to open the cartridge to permit access to the photosensitive media in the cartridge. The photosensitive media is withdrawn from the opened cartridge by imaging hardware associated with machine 10. The media is then imaged by other subsystems of laser imaging machine 10. The opening/closing system is also actuated to close the cartridge before the cartridge is removed from laser imaging machine 10. Since the cartridge is resealable, it can be removed from machine 10 before all the photosensitive media within the cartridge has been exposed. Cartridges with different sizes or types of media can therefore be conveniently loaded/reloaded into and removed from laser imaging machine 10 as needed, and without wasting any unused media remaining within the cartridge.

Laser imaging machine 10 may include more than one drawer so that more than one cartridge can be loaded into machine 10. This may be desirable if the cartridges contain photosensitive media of different sizes. As such, it is noted that the opening/closing system needs to be configured to operate with cartridges containing photosensitive media of different sizes.

An exemplary resealable cartridge 12 is described with reference to FIGS. 2 through 4. Other configurations may be known to those skilled in the art. Since resealable cartridges are well-known, the cartridge will not be discussed in detail.

Cartridge 12 includes an optically opaque media-receiving tray 20 and a flexible, optically opaque cover 22. The flexible cover 22 can be resealably mounted to tray 20 by an adhesive material 24, by means of magnetics, or other method known to those skilled in the art. For ease of explanation of the present invention, cover 22 is mounted by means of adhesive 24. Tray 20 can be molded in one piece from a photo-inert, polyolefin material. Tray 20 includes a bottom wall 26, a front wall 28A, a rear wall 28B, opposite side walls 28C, 28D, and a lip having sections 30A-30D extending outward from upper edges of walls 28A-28D, respectively, around a periphery of the tray. Adhesive material 24 may take the form of segments of adhesive disposed at intervals along lip sections 30A-30D, or a one-piece adhesive gasket applied to the lip. Side walls 28A-28D and lip sections 30A-30D define an access opening. For laser imaging, the access opening may contain one or more photosensitive media 31, as shown in FIG. 2. Photosensitive media 31 may comprise, for example, x-ray film, photosensitive film, photosensitive paper, or other photosensitive substrate materials for imaging applications.

Tray 20 includes inward projecting guides 32 formed on walls 28A-28D for properly positioning photosensitive media 31. Feet 34A-34D are formed into and extend downward from bottom wall 26 to support cartridge 12 within base 18 of the opening and closing mechanism in accordance with the present invention. A media presence monitoring well 35 also is formed in bottom wall 26. A media presence monitoring sensor associated with laser imaging machine 10 extends into well 35 below the surface of bottom wall 26 when all media have been removed from tray 20, thereby detecting that tray 20 is empty. Bottom wall 26 further includes positioning recesses 36, molded into feet 34A and 34B, that extend upward into tray 20 from the exterior surface of the bottom wall.

Figure 4:
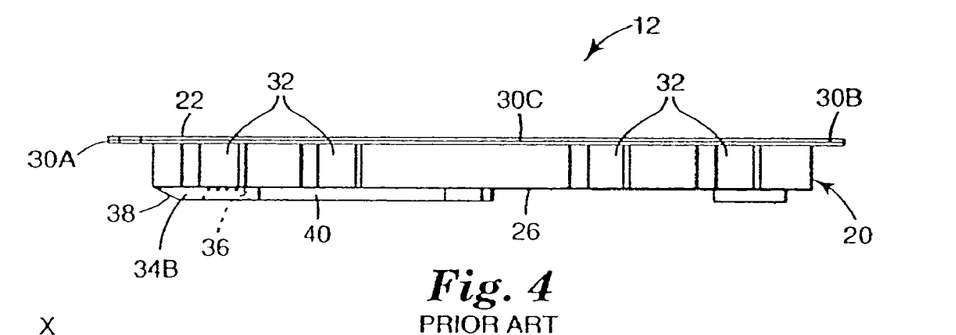
FIG. 4 shows a side view of the cartridge shown in FIG. 2.

Feet 34A, 34B formed adjacent front wall 28A include ramp surfaces 38 that slope downward from the lower edge of the front wall, as shown in FIG. 4. Ramp surfaces 38 can be employed to guide feet 34A, 34B over optional locator pins formed in base 18 when cartridge 12 is loaded into the base. Tray 20 further includes a recessed area 40 formed in bottom wall 26 that provides a platform on the exterior surface of the bottom wall. The platform formed by recessed area 40 can carry bar code indicia for identifying the type of media contained in cartridge 12.

Figure 2:
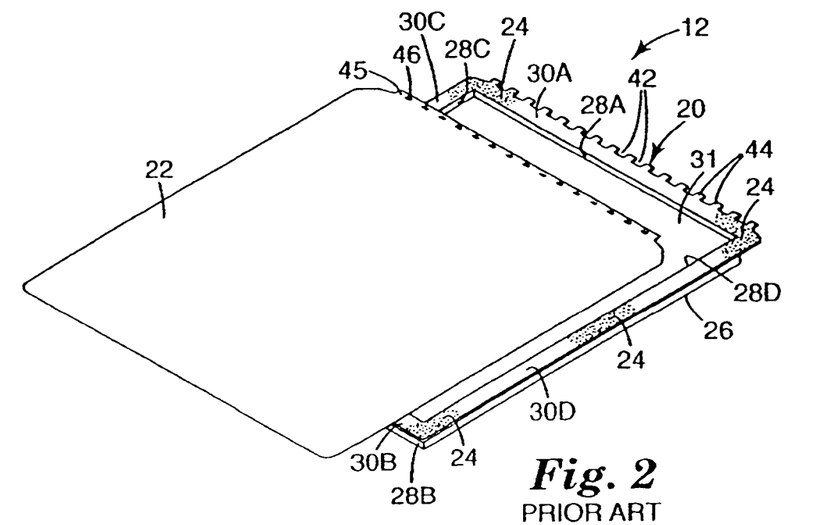
FIG. 2 shows an isometric view of a prior art resealable cartridge with the cover removed.
Figure 3:
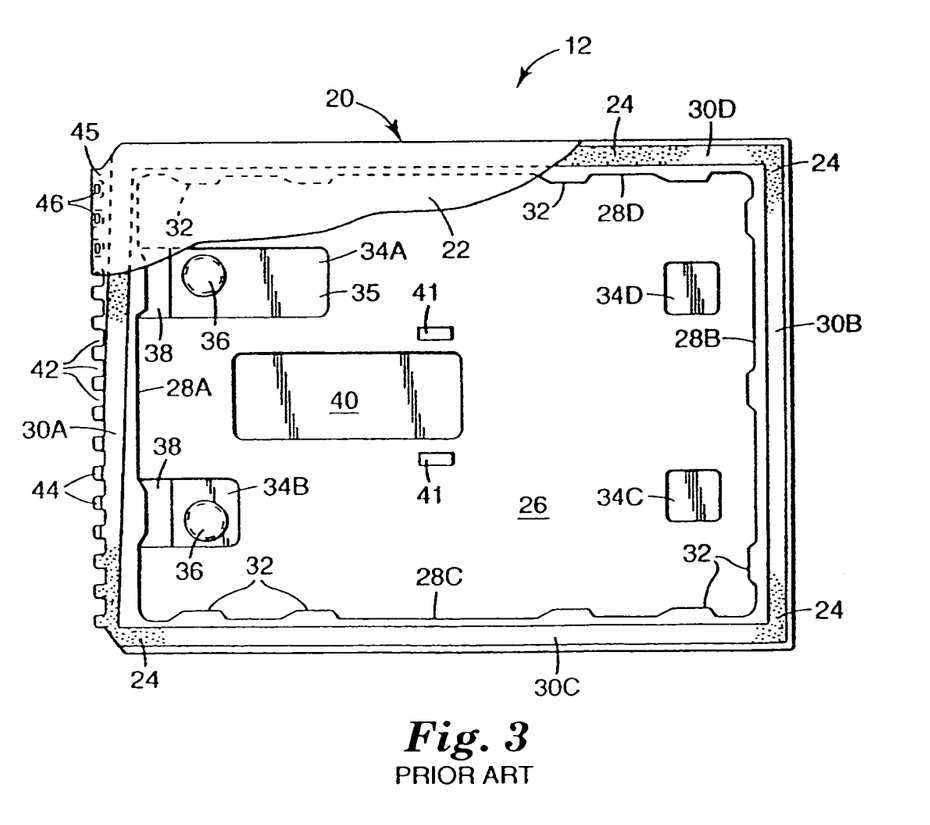
FIG. 3 shows a top view of the prior art cartridge of FIG. 2 with a portion of the cover removed.

With reference to FIGS. 2 and 3, a series of evenly spaced cut-out sections 42 are formed in lip section 30A over the top edge of front wall 28A. Cut-out sections 42 define a series of spaced projections 44 on lip section 30A. A forward area 45 of cover 22 includes a series of elongated apertures 46 aligned with cut-out sections 42 of tray 20 when the cover is disposed over the tray. The cut-out sections 42 cooperate with apertures 46 to facilitate engagement of cover 22 by the opening and closing mechanism of the present invention.

Cover 22 is preferably a flexible, photo-inert and optically opaque sheet of material sized to extend over the media access opening of tray 20 and mate with lip sections 30A-30D. The cover 22 comprises a material that is preferably stretchable enough to avoid pulling away from tray 20 when cartridge 12 is flexed, but rigid enough to resist excessive stretching during opening and closing operations. Cover 22 may also include a reinforcing strip (not shown) at a forward area 45 to increase the rigidity of the cover in the area above cut-out sections 42 of tray 20. The reinforcing strip is intended to resist tearing of apertures 46 during engagement with the opening and closing mechanism. The stretch-resistant material and reinforcing strip of cover 22 are designed to resist the damage caused by certain forces applied to the cover during the opening and closing operations, and thus address the effects of such forces in an effort to extend cartridge life.

The opening and closing system of the present invention is intended to reduce/eliminate the application of the forces responsible for stretching cover 22 and tearing apertures 46, thereby addressing the source of such problems. An exemplary embodiment of the opening and closing mechanism of the present invention will now be described in detail with reference to FIGS. 5-17.

Referring first to FIGS. 5-8, an opening and closing system 50 includes a base 52 for receiving and supporting resealable cartridge 12, a roller shaft 54 including means for engaging cover 22, a motor 56 for rotating roller shaft 54, and a carriage 58, slidably coupled to base 52, for supporting roller shaft 54 and motor 56. Carriage 58 can be mounted on drawer slides.

Generally, the purpose of opening and closing system 50 is to open and close cover 22 of cartridge 12. Roller shaft 54 rotates and spins along the front edge cartridge 12 until projections/teeth on roller shaft 54 engage apertures 46 in cover 22. Once engaged, roller shaft 54 rolls up onto the front and back walls of cartridge 12 (moving along the length of cartridge 12 in the direction shown by arrow A in FIG. 5), thereby wrapping cover 22 around/about the diameter of roller shaft 54. As the motorized roller shaft turns, it moves towards the center of cartridge 12 until cover 22 is open sufficiently to allow a mechanism or other device to remove the media from cartridge 12. Operating roller shaft 54 in the opposite direction reseals cartridge 12.

Figure 5:
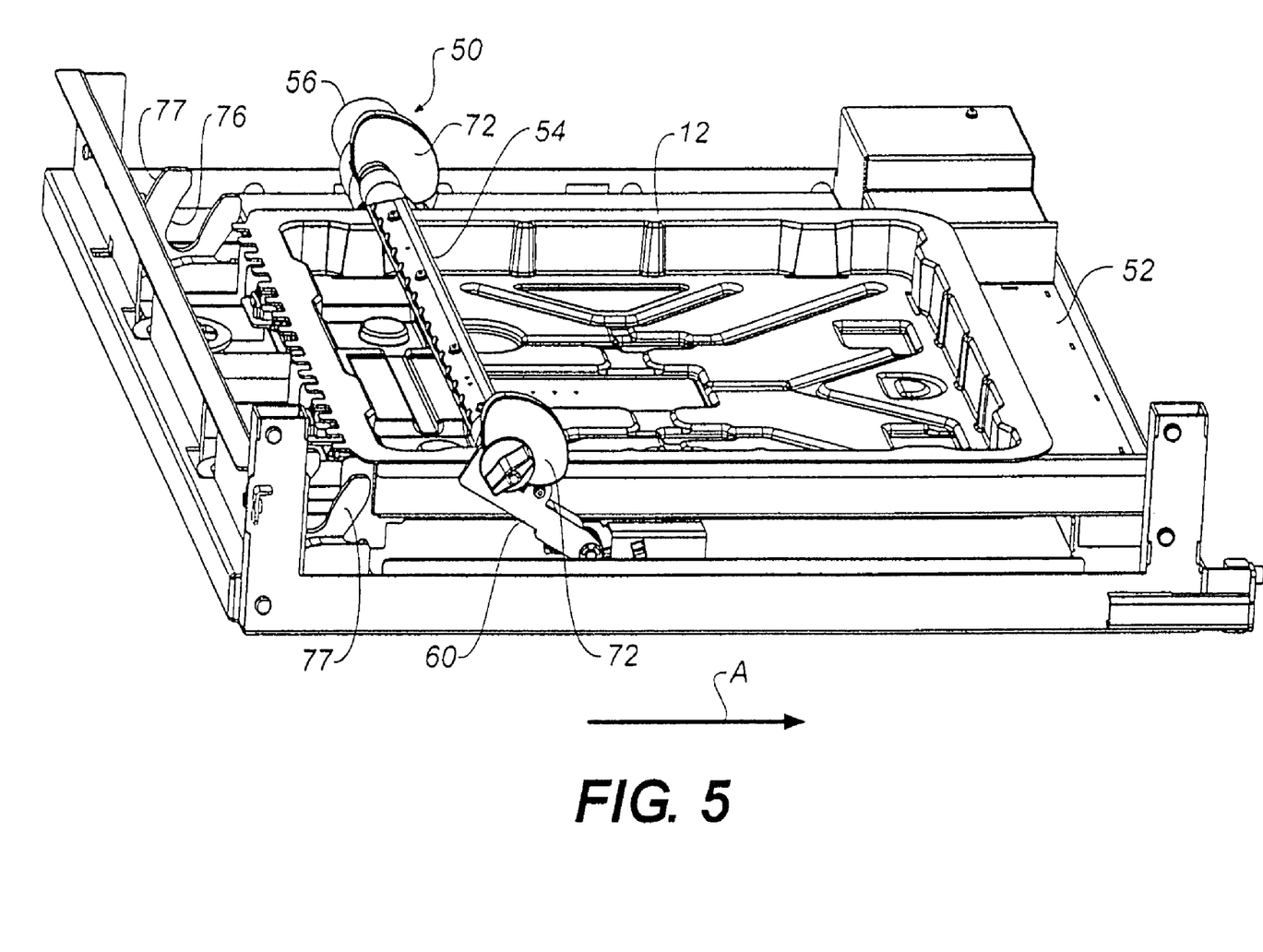
FIG. 5 shows an isometric view of the opening and closing system of the present invention for opening and closing the cartridge shown in FIG. 2.

More particularly, a rotation of roller shaft 54 in the first (opening) direction generates tractional force between roller shaft 54 and cartridge 12. A bias means applies a normal force that biases roller shaft 54 downward against cartridge 12. The carriage includes means for supporting roller shaft 54 and motor 56, as will be described. The tractional force results in a translational force that drives the carriage to slide along tray 20. A tractional force generated between roller shaft 54 and cover 22 during the closing operation similarly provides a translational force that drives the carriage to slide.

Figure 6:
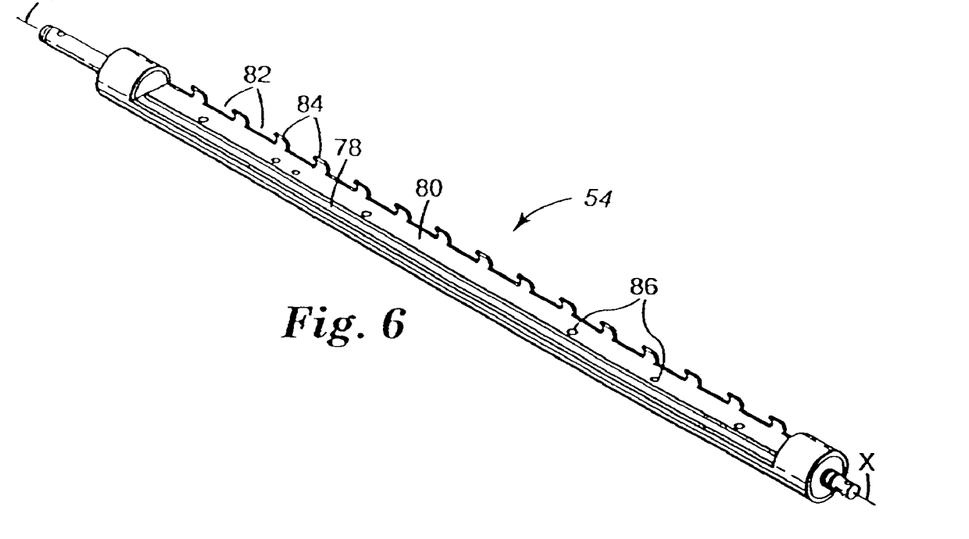
FIG. 6 shows a view of a roller shaft forming part of the opening and closing system of FIG. 5, in accordance with the present invention.
Figure 7:
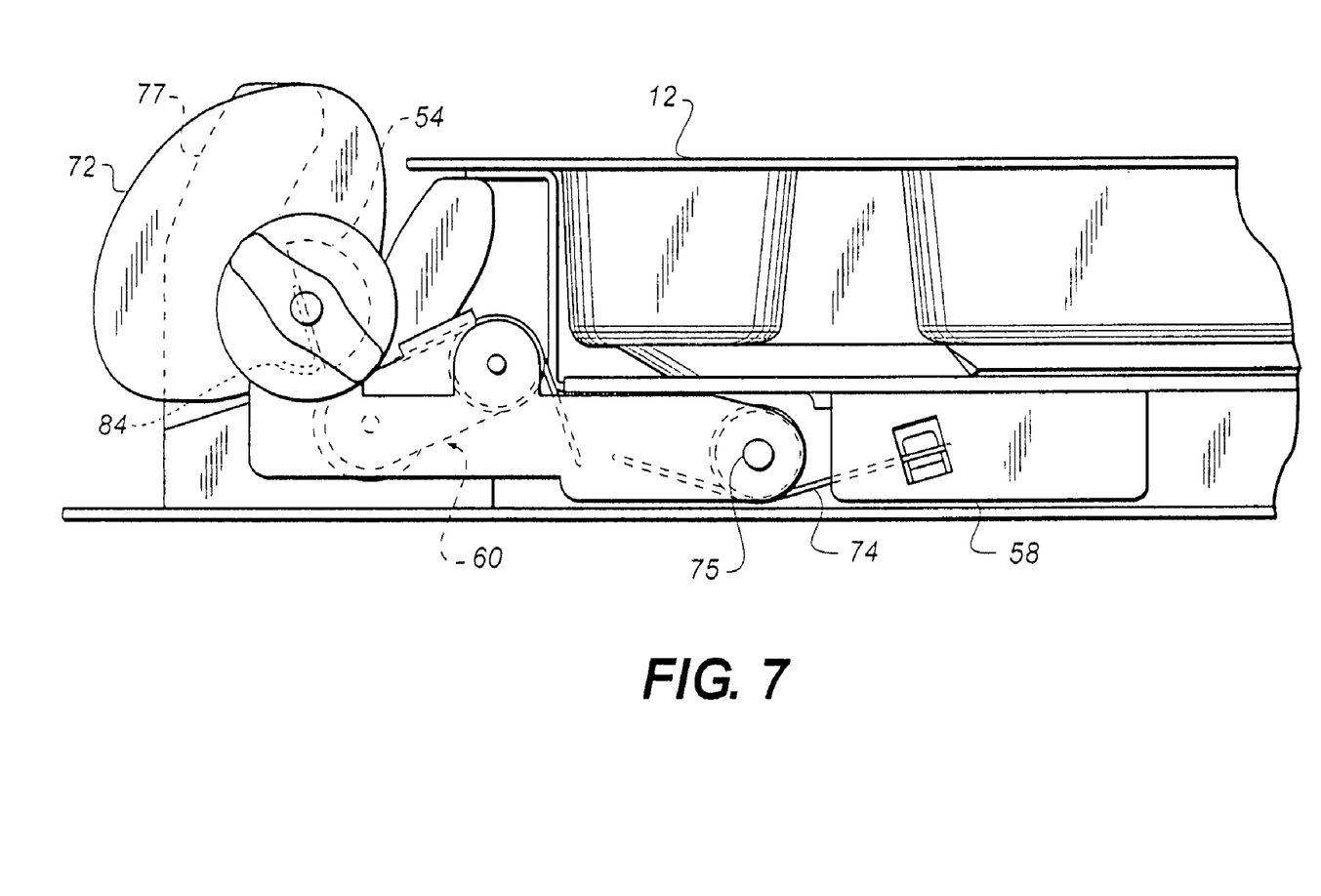
FIG. 7 shows a side view of the opening and closing system shown in FIG. 5

Roller shaft 54 is an elongated member, and can be formed of steel. A cut-out, winding section 78, extending along a central longitudinal axis, includes means for engaging apertures 46 in cover 22 to open and close cartridge 12.

As shown in FIG. 6, winding section 78 has a substantially semi-circular cross-section. In the embodiment shown, the cover engaging means of roller shaft 54 comprises an elongated, rectangular plate 80 having a plurality of indentations 82 defining curved, tooth-like projections 84. Projections 84 preferably are sized and spaced to fit within apertures 46 of cover 22, as well as cut-out sections 42, when roller shaft 54 is rotated downward toward base 18. Plate 80 and projections 84 may be constructed by stamping them out of a piece of sheet metal, and fastening them with screws 86 to a portion of winding section 78 that has been cut down to approximately a half diameter. The radius of curvature of projections 84 can be achieved by bending the plate 80 about a metal form.

Figure 8:
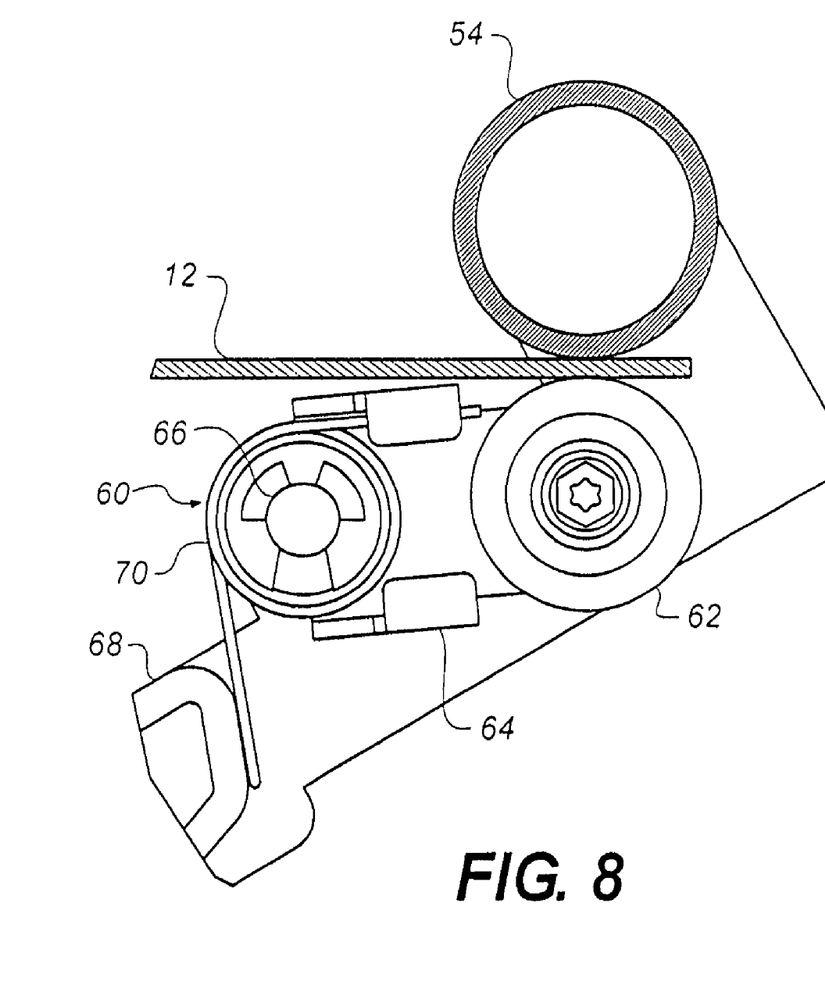
FIG. 8 shows a rear partial view of the spring assembly which provides a sealing force.

A spring assembly 60 is disposed at each end of roller shaft 54 to provide a sealing force. As best shown in FIG. 8, spring assembly 60 includes a pinch roller 62 attached to a bracket 64 that pivots about a shaft 66 attached to a roller link 68. A torsion spring 70 provides a torque to apply a suitable sealing force. In one embodiment of the present invention, a torque of 0.66 inch-pounds has been found to apply a suitable sealing force of 1.4 pounds.

Also disposed at each end of roller shaft 54 is a cam 72 which controls the motion of roller shaft 54 and provides indexing of roller shaft 54 during engagement with cover 22. A pair of torsion springs 74 disposed at each end of roller shaft 54 direct roller shaft 54 along a cam surface 76 of a pair of cam nests 77, as will be more particularly described below. Pivot mechanism 75 links torsion springs 74 with roller shaft 54. Motor 56 can be a single dc motor.

Figure 9A:
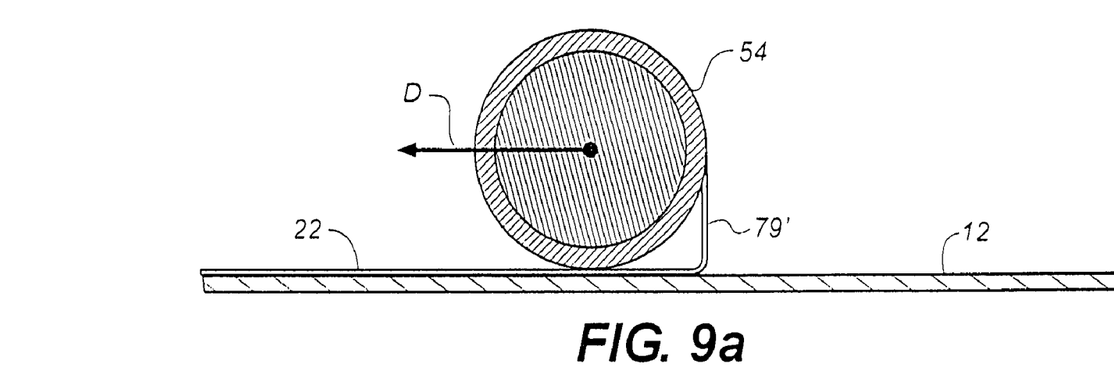
FIGS. 9a and 9b show the formation of a wrinkle in the cover which can occur during operation of the opening and closing system of the present invention.
Figure 9B:
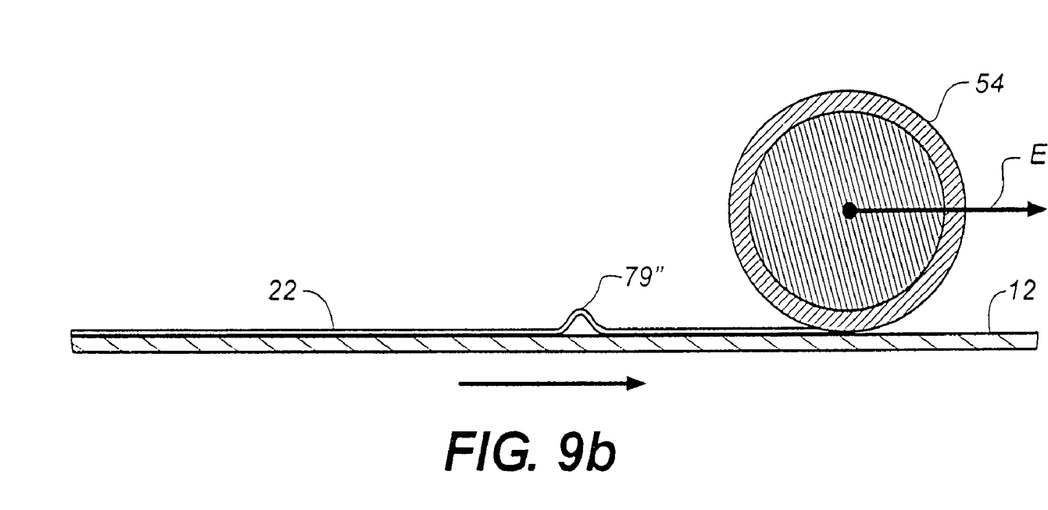

High roller pressure and wrinkles in cover 20 can limit the usable life of cartridge 12. High roller pressure displaces the cover adhesive, resulting in poor sealing characteristics, when the cartridge is open for extended periods (for example, overnight). Wrinkles occur when opening and closing system 50 is closing cartridge 12. FIGS. 9a and 9b illustrate a factor that leads to wrinkles. FIG. 9a shows roller shaft 54 operating (moving in opening direction D) to open cover 22 wherein a portion 79' of cover 22 does not conform roller shaft 54. FIG. 9b shows roller shaft 54 during the subsequent closing operation (moving in closing direction E) wherein the non-conforming portion 79' of cover 22 forms on the cartridge as a wrinkle 79".

Figure 10:
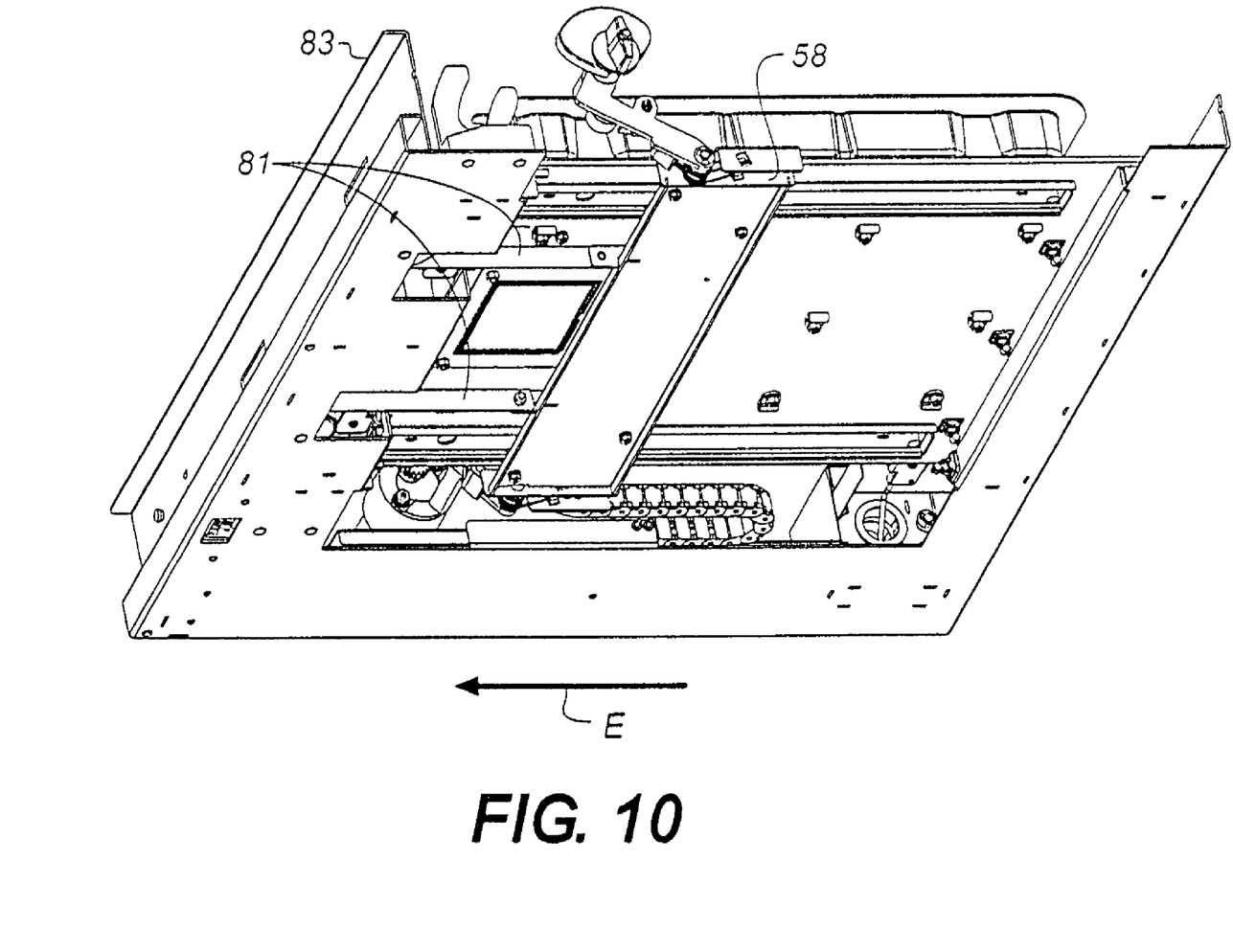
FIG. 10 shows a bottom isometric view of the opening and closing system shown in FIG. 5 showing the constant force springs used to reduce/eliminate wrinkles.

It was determined that adding a force in the closing direction (i.e., during the closing operation) keeps cover 22 tight/taught against roller shaft 54, thereby eliminating non-conforming cover portions and hence the wrinkles. Referring to FIG. 10, a pair of constant force springs 81 supplies a force sufficient to eliminate the wrinkles without pulling cover 22 closed. The constant force springs pull carriage 12 toward a frame 83 in the closing direction. This addition force eliminates the need for a high sealing force (high forces have been used on previous opening and closing systems), and eliminates the adhesive displacement. A force of 0.50 pounds for each constant force spring (1.00 pounds total) has been found to be suitable.

Figure 11:
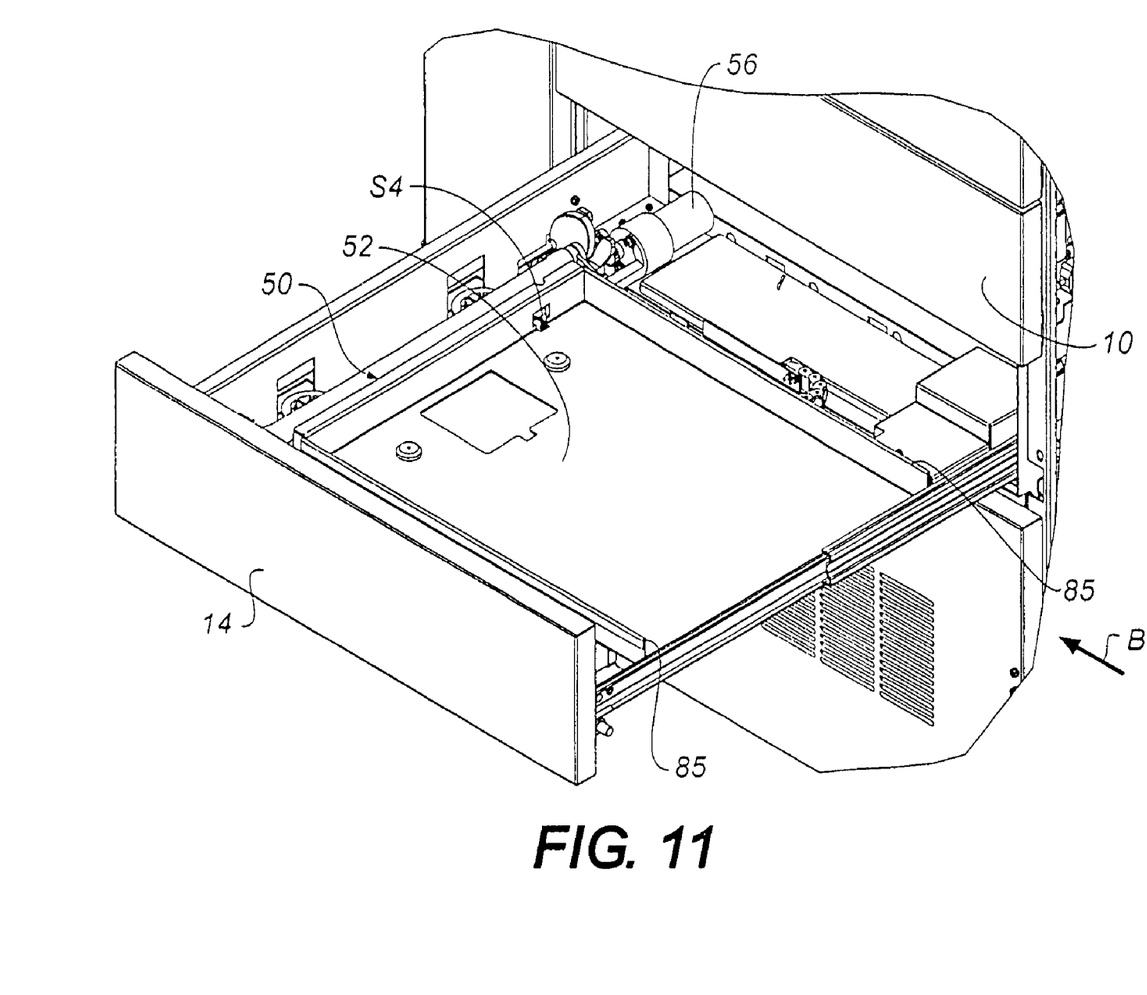
FIG. 11 shows an isometric view of the opening and closing system of the present invention disposed within a drawer of a laser imaging machine illustrating a first loading arrangement.

Referring now to FIG. 11, in operation, loading drawer/door 14 is opened and cartridge 12 is loaded into laser imaging machine 10 by sliding cartridge 12 onto base 52 in a direction shown by arrow B. One or more slides 85 can be employed to promote the loading/unloading of cartridge 12 in drawer/door 14. Note the positioning of opening and closing 50 relative to the direction of loading of cartridge 12. That is, cartridge 12 is loaded in a direction toward opening and closing system 50. As such, a user is not exposed to projections 84 when loading.

FIG. 11 provides an alternative loading arrangement. In this arrangement, cartridge 12 is loaded into laser imaging machine 10 by sliding cartridge 12 onto base 52 in a direction shown by arrow C along slide 85. With this loading arrangement, cartridge 12 is loaded in a direction along (i.e., parallel to) the axis of roller shaft 54. Opening and closing system 50 is disposed such that it does not interfere with the loading of cartridge 12.

Figure 12:
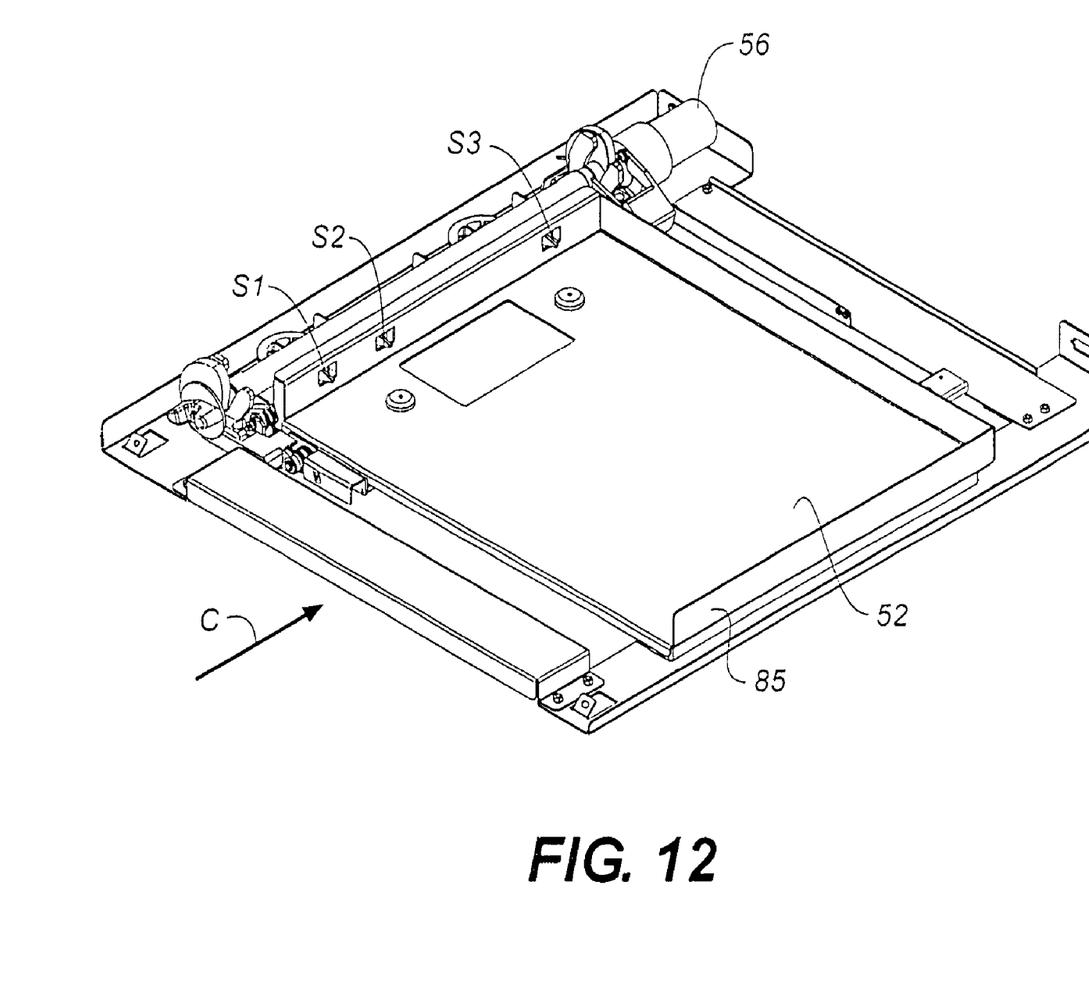
FIG. 12 shows an isometric view of the opening and closing system of the present invention illustrating a second loading arrangement.

One or more sensors can be employed to verify the cartridge condition (e.g., presence, absence, and/or proper orientation) of cartridge 12 within laser imaging machine 10. These sensors can be mechanical or electrical sensors, as is well known to those skilled in the art. For example, referring to FIG. 12, three sensors can be employed S1, S2, S3, with the sensors being mechanical members. With three sensors, three situations can be determined: the absence of the cartridge, the correct placement of the cartridge, and the incorrect placement of the cartridge. The situation can be determined by the state of each sensor. For example, the following can be determined:

|  | Sensor State | | |
| --- | --- | --- | --- |
| Cartridge Placement | Front | Middle | Back |
| None Present | Blocked | Blocked | Blocked |
| Correct | Unblocked | Blocked | Unblocked |
| Incorrect | Any Except Above | | |

Other Relationships May be Known to Those Skilled in the Art.

Referring again to FIG. 11, one sensor S4 is employed to verify the presence and/or proper orientation of cartridge 12. With the arrangement of FIG. 11, the following cartridge conditions can be determined:

| Cartridge Placement | Sensor State |
| --- | --- |
| None Present | Blocked |
| Correct | Unblocked |

Opening and closing system 50 can operate using one dc motor (i.e., motor 56) and two position sensors. FIGS. 13-17 illustrate the operation of opening and closing system 50 to open and close cartridge 12.

Figure 13:
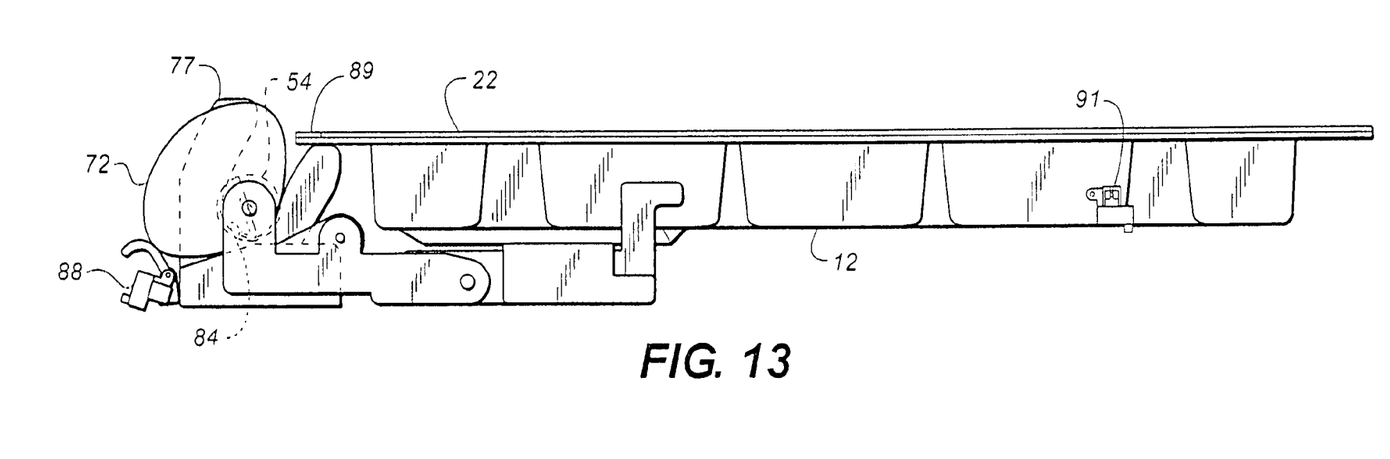
FIG. 13 shows a partial side view of the opening and closing system of the present invention in a first position referred to as the home position.

FIG. 13 shows a partial side view of opening and closing system 50 in a first position, referred to as the home position. This is the position of opening and closing system 50 when cartridge 12 is loaded in laser imaging machine 10. In this position, the components of system 50 are not disposed within the loading area of cartridge 12. In this position, cams 72 actuate a sensor 88 indicating that roller shaft 54 is in the home position. In this position, roller shaft 54 is disposed away from the perforated edge 89 of cover 22, and projections 84 are disposed downward, toward base 52.

Figure 14:
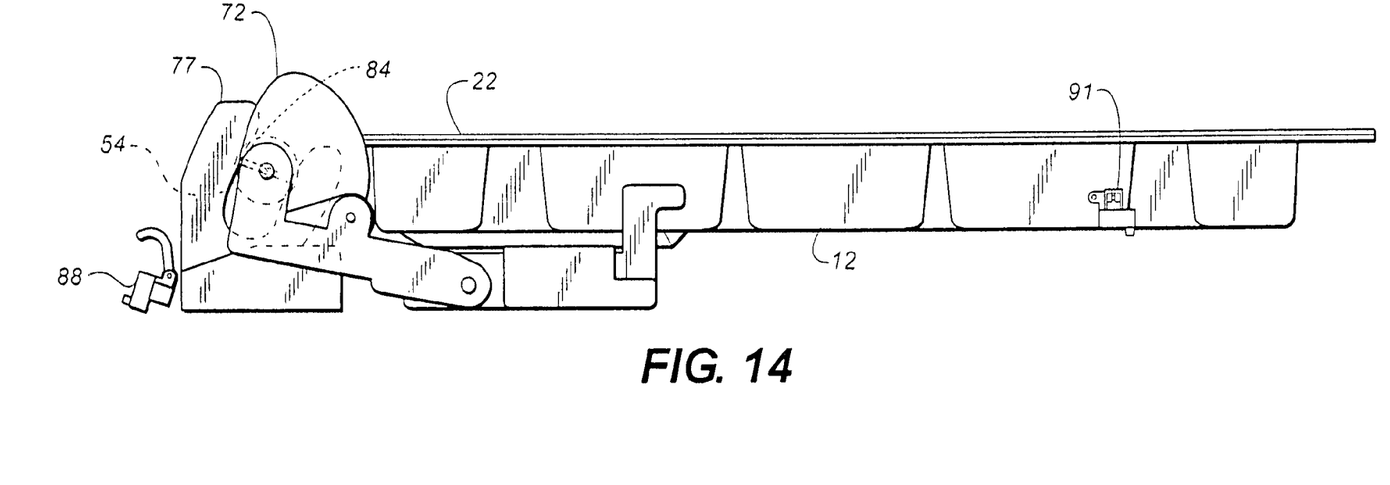
FIG. 14 shows a partial side view of the opening and closing system of the present invention in a second position referred to as the cam lift position.

FIG. 14 shows a partial side view of opening and closing system 50 in a second position, referred to as the cam lift position. In this position, each cam 72 interfaces with a surface on cam nest 77 to lift/raise roller shaft 54 towards perforated edge 89 of cover 22.

Figure 15:
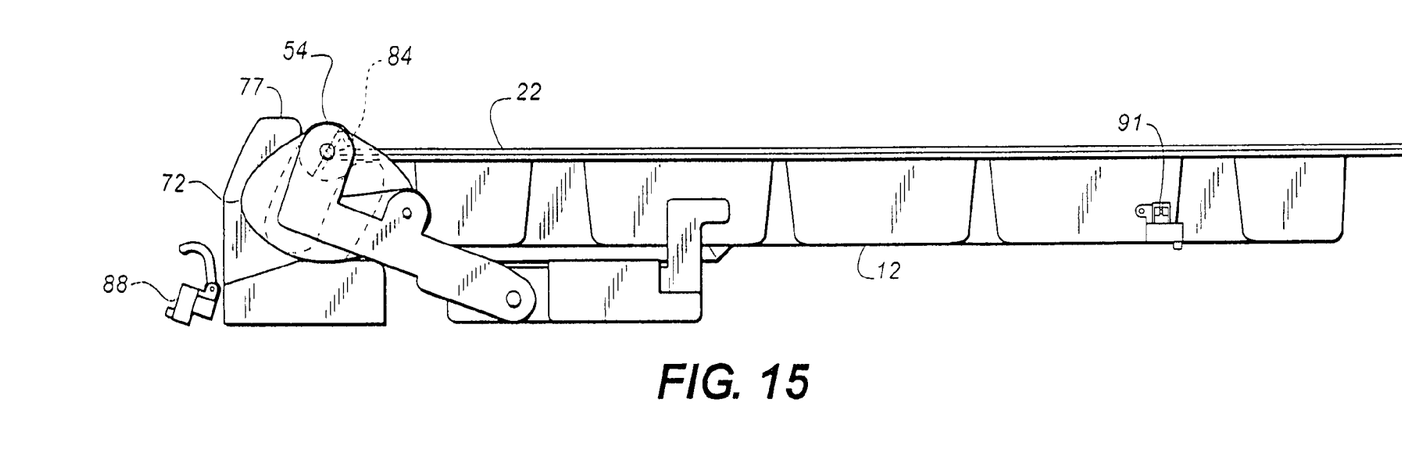
FIG. 15 shows a partial side view of the opening and closing system of the present invention in a third position referred to as the cam dwell position.

FIG. 15 shows a partial side view of opening and closing system 50 in a third position, referred to as the cam dwell position. In this position, each cam 72 interfaces with a surface on cam nest 77 in a dwell state.

Figure 16:
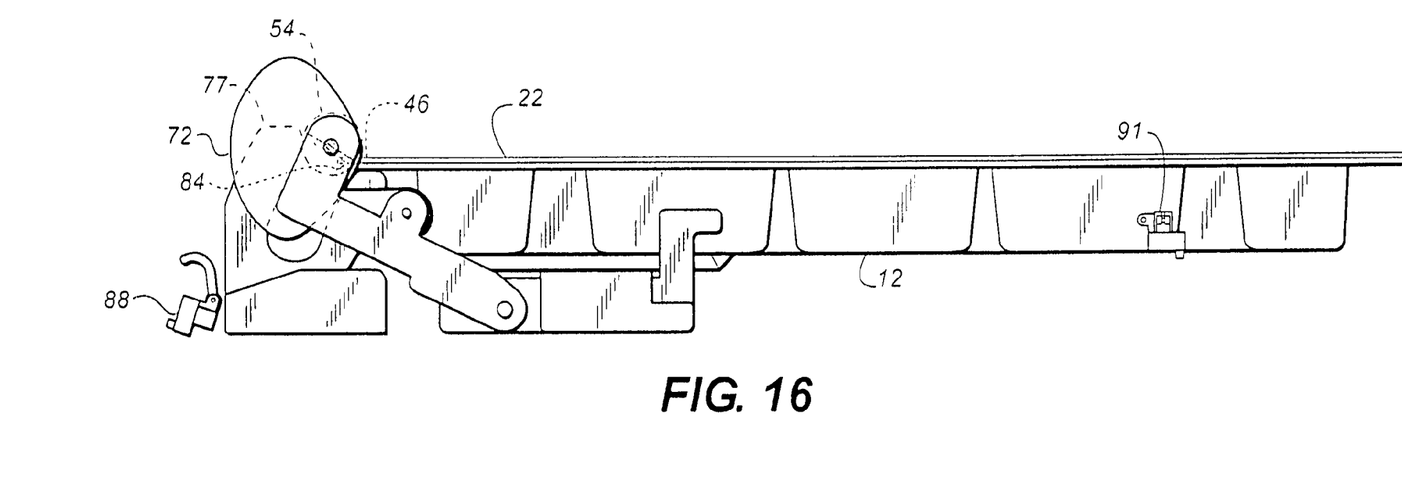
FIG. 16 shows a partial side view of the opening and closing system of the present invention in a fourth position referred to as the cover engaged position.

FIG. 16 shows a partial side view of opening and closing system 50 in a fourth position, referred to as the cover engaged position. In this position, roller shaft 54 continues to rotate and projections 84 engage apertures 46 of cover 22.

Figure 17:
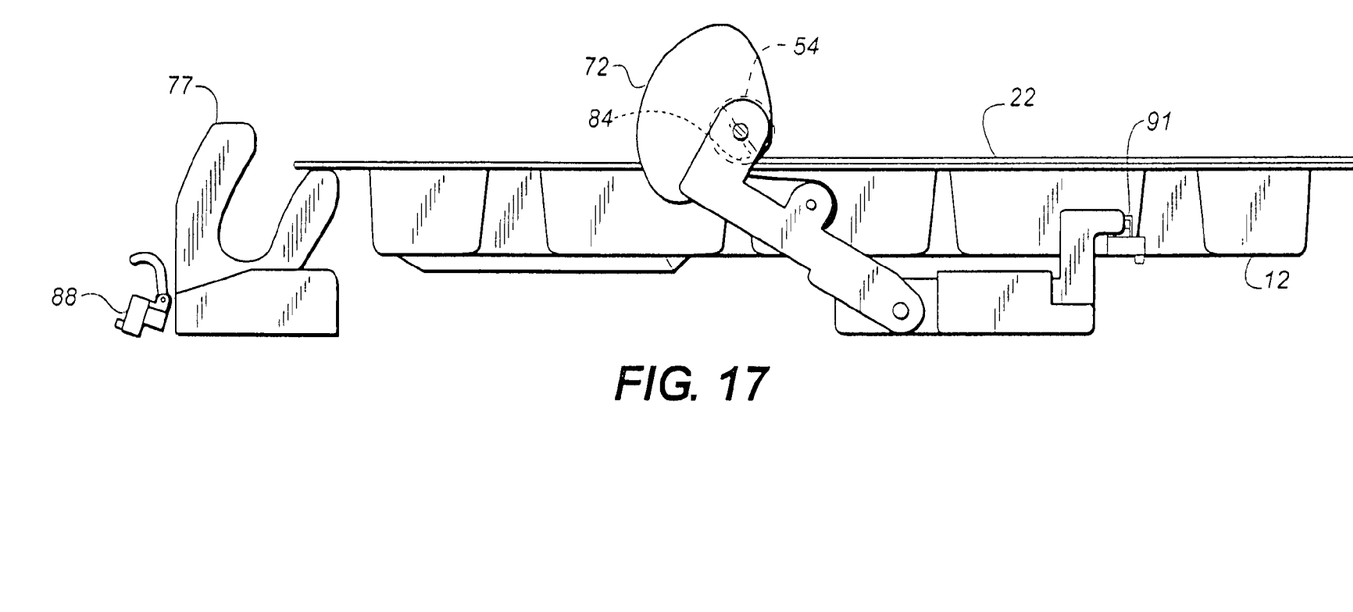
FIG. 17 shows a partial side view of the opening and closing system of the present invention in a fifth position referred to as the open position.

FIG. 17 shows a partial side view of opening and closing system 50 in a fifth position, referred to as the open position. In this position, an end-of-travel sensor 91 is blocked to indicate the end of the travel for opening and closing system 50.

Reversing the positions shown in FIGS. 13-17 effects closure/sealing of cover 22 on cartridge 12.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

| PARTS LIST | |
| --- | --- |
| 10 | laser imaging machine |
| 12 | resealable cartridge |
| 14 | hinge loading door |
| 18 | base |
| 20 | media receiving tray |
| 22 | flexible cover |
| 24 | adhesive material |
| 26 | bottom wall |
| 28A | front wall |
| 28B | rear wall |
| 28C-28D | opposite side walls |
| 30A-30D | lip sections |
| 31 | photosensitive media |
| 32 | projecting guides |
| 34A-34D | feet |
| 35 | monitoring well |
| 36 | positioning recesses |
| 38 | ramp surfaces |
| 40 | recessed area |
| 42 | cut out sections |
| 44 | spaced projections |
| 45 | forward area |
| 46 | elongated apertures |
| 50 | opening/closing system |
| 52 | base |
| 54 | roller shaft |
| 56 | motor |
| 58 | carriage |
| 60 | spring assembly |
| 62 | pinch roller |
| 64 | bracket |
| 66 | shaft |
| 68 | roller link |
| 70 | torsion spring |
| 72 | cam |
| 74 | torsion springs |
| 75 | pivot mechanism |
| 76 | cam surface |
| 77 | cam nests |
| 78 | winding section |
| 79' | portion |
| 79" | wrinkle |
| 80 | rectangular plate |
| 81 | springs |
| 82 | indentations |
| 83 | frame |
| 84 | projections |
| 85 | slides |
| 86 | screws |
| 88 | sensor |
| 89 | perforated edge |
| 91 | end of travel sensor |
| S1-S4 | sensors |

What is claimed is:

1. A system for opening and closing a resealable cartridge having a tray and a flexible cover resealably engaged with the tray, the system comprising:
   a base for receiving the tray of the cartridge;
   a roller shaft having means for engaging the cover of the cartridge;
   positioning means operably connected to the roller shaft to affect positioning of the roller shaft relative to the cartridge between a first position wherein the roller shaft is spaced from the cartridge and a second position different from the first position wherein the roller shaft is not spaced from the cartridge;
   a motor for rotating the roller shaft in a first rotational direction to wind the cover about the roller shaft, thereby removing at least a portion of the cover from the tray, and for rotating the roller shaft in a second rotational direction to unwind the cover from the roller shaft thereby resealably engaging the cover with the tray; and
   at least one constant force spring attached to the base and applying a force in the second rotational direction to the roller shaft.

2. The system of claim 1, wherein the positioning means further includes a cam.

3. The system of claim 2, wherein the positioning means further includes a cam nest.

4. The system of claim 3, wherein the system further includes at least one torsion spring biasing the cam toward the cam nest.

5. The system of claim 1, further comprising:
   first sensing means positioned at a first location for sensing a first position of the roller shaft wherein the roller shaft is spaced from the cartridge; and
   second sensing means positioned at a second location different than the first location for sensing a second position of the roller shaft indicative of the removal of at least a portion of the cover from the tray.

6. The system of claim 5, wherein the first and second sensing means are activated by the opening and closing system.

7. The system of claim 1, further comprising a pinch roller attached to the base and biased toward the roller shaft to supply a force between the roller shaft and the cartridge.

8. A system for opening and closing a resealable cartridge having a tray and a flexible cover resealably engaged with the tray, the system comprising:
   a base for receiving the tray of the cartridge;
   a roller shaft having means for engaging the cover of the cartridge;
   a motor for rotating the roller shaft in a first rotational direction to wind the cover about the roller shaft, thereby removing at least a portion of the cover from the tray, and for rotating the roller shaft in a second rotational direction to unwind the cover from the roller shaft thereby resealably engaging the cover with the tray;
   positioning means operably connected to the roller shaft to affect positioning of the roller shaft, the positioning means positioning the roller shaft in a first position spaced from the cartridge and disposed intermediate the base and the cover; and
   at least one constant force spring attached to the base and applying a force in the second rotational direction to the roller shaft.

9. The system of claim 8, wherein the positioning means further includes a cam operably connected to the roller shaft.

10. The system of claim 8, further comprising a pinch roller attached to the base and biased toward the roller shaft to supply a force between the roller shaft and the cartridge.

11. The system of claim 8, further comprising:
   first sensing means positioned at a first location for sensing a first position of the roller shaft wherein the roller shaft is spaced from the cartridge; and
   second sensing means positioned at a second location different than the first location for sensing a second position of the roller shaft indicative of the removal of at least a portion of the cover from the tray.

12. The system of claim 11, wherein the first and second sensing means are activated by the opening and closing system.

* * * * *